United States Patent
Pelouch et al.

(10) Patent No.: US 8,380,069 B2
(45) Date of Patent: Feb. 19, 2013

(54) INTRODUCTION-SIDE DISPERSION SHIFTING OF CHANNELS

(75) Inventors: Wayne S. Pelouch, McKinney, TX (US); Do-Il Chang, Allen, TX (US)

(73) Assignee: Xtera Communications Inc., Allen, TX (US)

(*) Notice: Subject to any disclaimer, the term of this patent is extended or adjusted under 35 U.S.C. 154(b) by 356 days.

(21) Appl. No.: 12/909,721

(22) Filed: Oct. 21, 2010

(65) Prior Publication Data

US 2011/0097088 A1    Apr. 28, 2011

Related U.S. Application Data

(60) Provisional application No. 61/255,448, filed on Oct. 27, 2009.

(51) Int. Cl.
*H04J 14/02* (2006.01)
(52) U.S. Cl. .......................................... 398/81; 398/147
(58) Field of Classification Search ............. 398/81, 398/147
See application file for complete search history.

(56) References Cited

U.S. PATENT DOCUMENTS

| | | | |
|---|---|---|---|
| 7,406,264 B2* | 7/2008 | Feldman et al. | 398/148 |
| 7,499,173 B1 | 3/2009 | Brodsky et al. | |
| 7,983,564 B2* | 7/2011 | Ooi et al. | 398/81 |
| 2002/0159136 A1 | 10/2002 | Lu et al. | |
| 2005/0213985 A1* | 9/2005 | Stephens et al. | 398/140 |
| 2005/0238362 A1* | 10/2005 | Sekiya et al. | 398/147 |
| 2005/0265725 A1* | 12/2005 | Okano et al. | 398/147 |
| 2008/0084605 A1 | 4/2008 | Rothenberg et al. | |

FOREIGN PATENT DOCUMENTS

| | | |
|---|---|---|
| EP | 1241810 A | 9/2002 |
| EP | 1261153 A | 11/2002 |
| WO | 2004114530 A | 12/2004 |

OTHER PUBLICATIONS

PCT/US2010/054107, Notification of transmittal of the ISR and the Written Opinion of the ISA, or Declaration dated Apr. 27, 2012.

* cited by examiner

*Primary Examiner* — Dzung Tran
(74) *Attorney, Agent, or Firm* — Workman Nydegger (57) ABSTRACT

The mixing of coherent optical wavelength channels with non-coherent optical wavelength channels. Before mixing, a dispersive element introduces dispersion into the coherent optical wavelength channels and/or into the non-coherent optical wavelength channels such that the dispersion map of the coherent optical wavelength channels is different than the dispersion map of the non-coherent optical wavelength channels. By allowing the coherent channels to have a different dispersion map, the dispersion map may be moved further from the zero dispersion point, which can degrade coherent detection. Accordingly, coherent optical channels and non-coherent optical channels may be transmitted effectively over the same optical link.

19 Claims, 7 Drawing Sheets

INTRODUCTION-SIDE DISPERSION SHIFTING OF CHANNELS

CROSS REFERENCE TO RELATED APPLICATIONS

This patent application claims the benefit under 35 U.S.C. 119 of co-pending provisional U.S. patent application Ser. No. 61/255,448 filed Oct. 27, 2009, and entitled "Mixed Dispersion Map Optical Link".

BACKGROUND

Fiber-optic communication networks serve a key demand of the information age by providing high-speed data between network nodes. Fiber-optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic links are used in a wide variety of applications, each requiring different lengths of fiber-optic links. For instance, relatively short fiber-optic links may be used to communicate information between a computer and its proximate peripherals, or between a local video source (such as a DVD or DVR) and a television. On the opposite extreme, however, fiber-optic links may extend hundreds or even thousands of kilometers when the information is to be communicated between two network nodes.

Long-haul and ultra-long-haul optics refers to the transmission of light signals over long fiber-optic links on the order of hundreds or thousands of kilometers. Typically, long-haul optics involves the transmission of optical signals on separate channels over a single optical fiber, each channel corresponding to a distinct wavelength of light using principles of Wavelength Division Multiplexing (WDM) or Dense WDM (DWDM).

Transmission of optical signals over such long distances using WDM or DWDM presents enormous technical challenges, especially at high bit rates in the gigabits per second per channel range. Significant time and resources may be required for any improvement in the art of high speed long-haul and ultra-long-haul optical communication. Each improvement can represent a significant advance since such improvements often lead to the more widespread availability of communications throughout the globe. Thus, such advances may potentially accelerate humankind's ability to collaborate, learn, do business, and the like, with geographical location becoming less and less relevant.

BRIEF SUMMARY

Embodiments described herein relate to the use of mixed dispersion maps in an optical link that includes a series of dispersive elements, at least some of the dispersive elements being one or more fiber segments between nodes in an optical communication link. All optical fiber is dispersive wherein the dispersion value varies with optical wavelength and may be negative, positive, or zero at some wavelength within the wavelength range used for optical communication. In addition to the fiber that connects nodes in an optical link, optical dispersion compensating modules (DCMs) may be placed at some nodes to fully or partially compensate for the dispersion of the fiber. The value of the total accumulated dispersion (both fiber and DCMs—if present) as a function of distance through an optical communication link is commonly referred to as the "dispersion map."

Optical channels encoded with digital data are transmitted on the optical link to carry information between nodes in the optical communication link. Most optical channels in use today are detected (converted from optical to electrical format) directly or non-coherently, which is to say that the electric field (both phase and amplitude) of the optical channel is not measured. Optical channels that are directly detected are sensitive to the total accumulated dispersion in an optical link such that the total accumulated dispersion should be close to zero within some range that depends on the optical channel bit rate, transmit frequency chirp, and modulation format. A typical dispersion range for detecting 10 gigabit per second (Gbps) non-return-to-zero (NRZ) channels is +/−1000 ps/nm.

Optical channels that are coherently detected, which is to say that the phase and amplitude of the optical electric field is measured, can compensate for dispersion electronically to a large extent after detection. A typical electronic dispersion compensation range for coherently detected optical channels is ±50,000 ps/nm or more. Thus, coherently detected channels do not have the same dependency on accumulated dispersion as directly detected channels, and in fact often have a better detected signal quality when the dispersion compensation within the optical link is not close to 100%.

In accordance with the principles described herein, the optical introduction node mixes one or more coherent optical wavelength channels with one or more non-coherent optical wavelength channels. Before doing so, however, a dispersive element introduces dispersion into the coherent optical wavelength channel set and/or into the non-coherent optical wavelength channel set such that the dispersion map of the coherent optical wavelength channel set is shifted from the dispersion map of the non-coherent optical wavelength channel set.

By allowing the coherent channels to have a different dispersion map, the dispersion map may be moved further from the zero dispersion point, which can degrade coherent detection. Accordingly, coherent optical channels and non-coherent optical channels may be transmitted effectively over the same optical link.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, one or more coherent optical wavelength channels are mixed with one or more non-coherent optical wavelength channels prior to introduction onto an optical fiber link. Before mixing, however, a dispersive element introduces dispersion into the one or more coherent optical wavelength channels and/or into the one or more non-coherent optical wavelength channels such that the dispersion map of the coherent optical wavelength channel(s) is different than the dispersion map of the non-coherent optical wavelength channels.

By allowing the coherent channels to have a different dispersion map, the dispersion map may be moved further from the zero dispersion point. This can benefit signal quality as the zero dispersion point can degrade the transmission quality of coherent channels. Accordingly, coherent optical channels and non-coherent optical channels may be transmitted effectively over the same optical link.

Most optical links in use today were designed for non-coherent optical channels which require dispersion compensation. The total accumulated dispersion in an optical link can become quite large and therefore the dispersion is typically at least partially compensated inline, or periodically within the link. It is common to provide 50% to 95% inline dispersion compensation with the remaining compensation completed in the transmit and receive terminals. This design of dispersion compensation results in a dispersion map that may not be optimal for coherent optical wavelength channels which not only typically do not require inline compensation, but also may suffer a degraded signal quality during transmission through a dispersion compensated optical link. Thus, it may be difficult to upgrade non-coherent optical networks with coherent optical wavelength channels.

Figure 1:
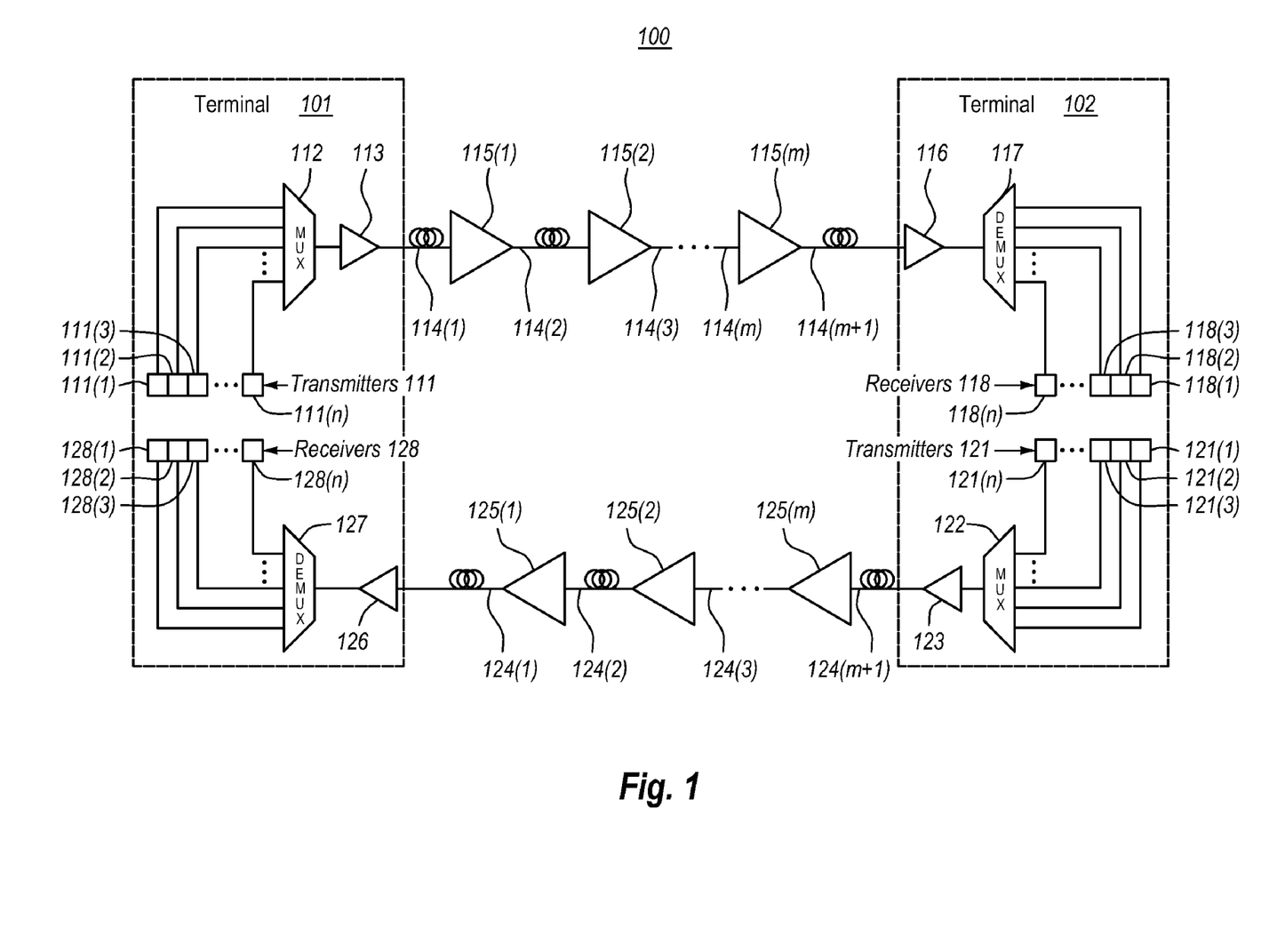
FIG. 1 illustrates an optical communication system in which the principles described herein may be employed.

FIG. 1 schematically illustrates an example optical communications system 100 in which the principles described herein may be employed. In the optical communications system 100, information is communicated between terminals 101 and 102 via the use of optical signals. For purposes of convention used within this application, optical signals travelling from the terminal 101 to terminal 102 will be referred to as being "eastern", whereas optical signals traveling from the terminal 102 to the terminal 101 will be referred to as being "western". The terms "eastern" and "western" are simply terms of art used to allow for easy distinction between the two optical signals traveling in opposite directions. The use of the terms "eastern" and "western" does not imply any actual geographical relation of components in FIG. 1, nor to any actual physical direction of optical signals. For instance, terminal 101 may be geographical located eastward of the terminal 102, even though the convention used herein has "eastern" optical signals traveling from the terminal 101 to the terminal 102.

In one embodiment, the optical signals are Wavelength Division Multiplexed (WDM) and potentially Dense Wavelength Division Multiplexed (DWDM). In WDM or DWDM, information is communicated over each of multiple distinct optical channels called hereinafter "optical wavelength channels". Each optical wavelength channel is allocated a particular frequency for optical communication. Accordingly, in order to communicate using WDM or DWDM optical signals, the terminal 101 may have "n" optical transmitters 111 (including optical transmitters 111(1) through 111($n$), where n is a positive integer), each optical transmitter for transmitting over a corresponding eastern optical wavelength channel. Likewise, the terminal 102 may have "n" optical transmitters 121 including optical transmitters 121(1) through 121($n$), each also for transmitting over a corresponding western optical wavelength channel. The principles described herein are not limited, however, to communications in which the number of eastern optical wavelength channels is the same as the number of western optical wavelength channels. Furthermore, the principles described herein are not limited to the precise structure of the each of the optical transmitters. However, lasers are an appropriate optical transmitter for transmitting at a particular frequency. That said, the optical transmitters may each even be multiple laser transmitters, and may be tunable within a frequency range.

As for the eastern channel for optical transmission in the eastern direction, the terminal 101 multiplexes each of the eastern optical wavelength signals from the optical transmitters 111 into a single eastern optical signal using optical multiplexer 112, which may then be optically amplified by an optional eastern optical amplifier 113 prior to being transmitted onto a first fiber link 114(1).

There are a total of "m" repeaters 115 and "m+1" optical fiber links 114 between the terminals 101 and 102 in the eastern channel. In an unrepeatered optical communication system, "m" would be zero such that there is but a single fiber link 114(1) and no repeaters between the terminals 101 and 102. In a repeatered optical communication system, "m" would be one or greater. Each of the repeaters, if present, may consume electrical power to thereby amplify the optical signals.

The eastern optical signal from the final optical fiber link 114($m$+1) is then optionally amplified at the terminal 102 by the optional optical amplifier 116. The eastern optical signal is then demultiplexed into the various wavelength optical wavelength channels using optical demultiplexer 117. The various optical wavelength channels may then be received and processed by corresponding optical receivers 118 including receivers 118(1) through 118($n$).

As for the western channel for optical transmission in the western direction, the terminal 102 multiplexes each of the western optical wavelength signals from the optical transmitters 121 (including optical transmitters 121(1) through 121($n$)) into a single western optical signal using the optical multiplexer 122. The multiplexed optical signal may then be optically amplified by an optional western optical amplifier 123 prior to being transmitted onto a first fiber link 124($m$+1). There are once again "m" repeaters 125 (labeled 125(1) through 125($m$)), and "m+1" optical fiber links 124 (labeled 124(1) through 124($m$+1)). Recall that in an unrepeatered environment, "m" may be zero such that there is only one optical fiber link 124(1) and no repeaters 125 in the western channel.

The western optical signal from the final optical fiber link 124(1) is then optionally amplified at the terminal 101 by the optional optical amplifier 126. The western optical signal is then demultiplexed using optical demultiplexer 127, whereupon the individual wavelength division optical channels are received and processed by the receivers 128 (including receivers 128(1) through 128($n$)). Terminals 101 and/or 102 do not require all the elements shown in optical communication system 100. For example, optical amplifiers 113, 116, 123, and/or 126 might not be used in some configurations. Furthermore, if present, each of the corresponding optical amplifiers 113, 116, 123 and/or 126 may be a combination of multiple optical amplifiers if desired.

Often, the optical path length between repeaters is approximately the same. The distance between repeaters will depend on the total terminal-to-terminal optical path distance, the data rate, the quality of the optical fiber, the loss-characteristics of the fiber, the number of repeaters (if any), the amount of electrical power deliverable to each repeater (if there are repeaters), and so forth. However, a typical optical path length between repeaters (or from terminal to terminal in an unrepeatered system) for high-quality single mode fiber might be about 50 kilometers, and in practice may range from 30 kilometers or less to 90 kilometers or more. That said, the principles described herein are not limited to any particular optical path distances between repeaters, nor are they limited to repeater systems in which the optical path distances are the same from one repeatered segment to the next.

The optical communications system 100 may comprise spans or repeaters that are submerged below water (submarine) or located on land (terrestrial) or any combination of submarine or terrestrial nodes or spans. The components of optical communication system 100 are not restricted to any specific type of communications network. Furthermore, terminals 101 and 102 may be co-located (e.g. a ring network) or separate (e.g. a linear network).

The optical communications system 100 is represented in simplified form for purpose of illustration and example only. The principles described herein may extend to much more complex optical communications systems. The principles described herein may apply to optical communications in which there are multiple fiber pairs, each for communicating multiplexed WDM optical signals. Furthermore, the principles described herein also apply to optical communications in which there are one or more branching or multi-degree nodes that split one or more fiber pairs and/or optical wavelength channels in one direction, and one or more fiber pairs and/or optical wavelength channels in another direction. In addition, the principles described herein apply to asymmetric bi-directional optical channels in which there are a different number of repeaters in the eastern direction as compared to the western direction.

Figure 2:
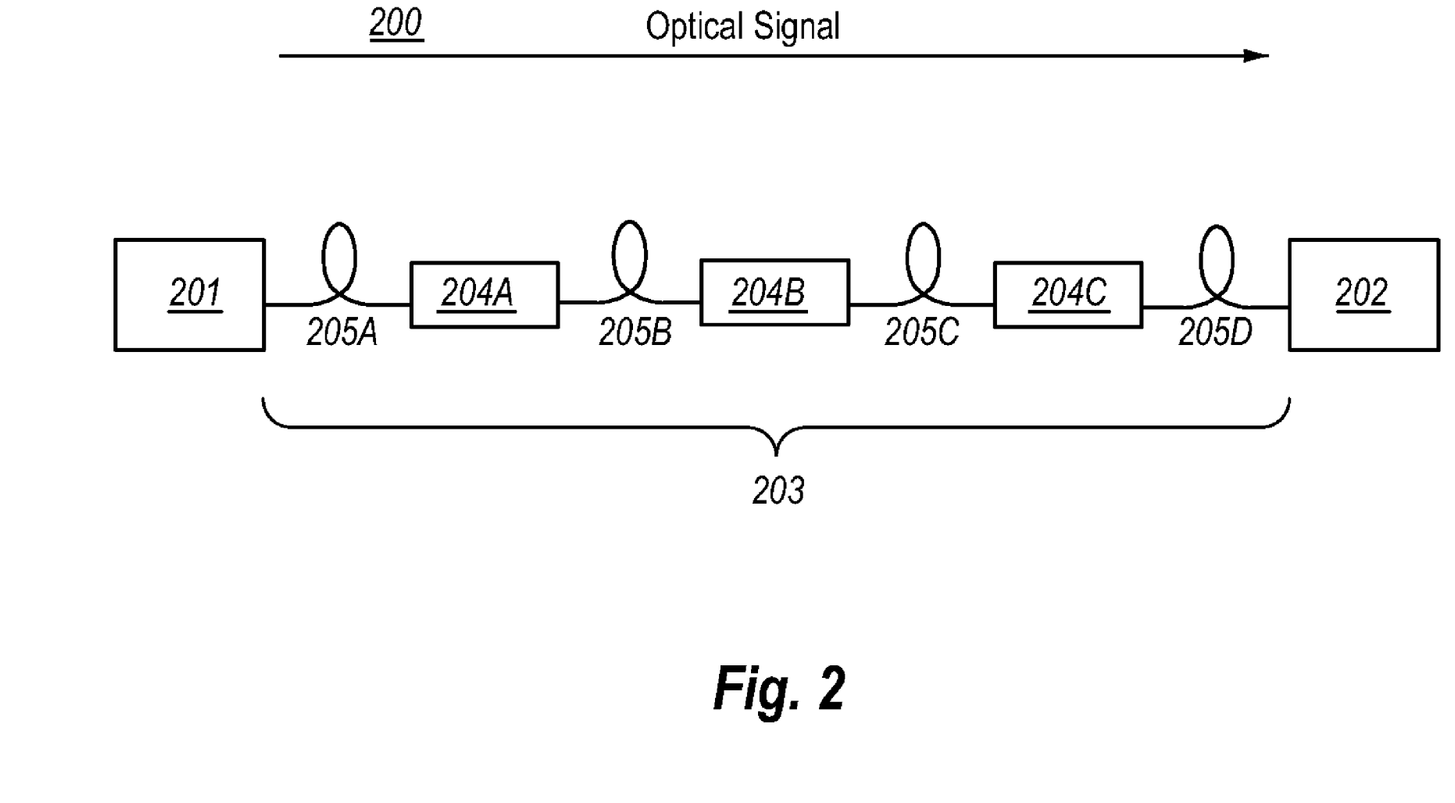
FIG. 2 illustrates an optical system in which there are a series of dispersion compensation modules disposed in an optical link between two optical nodes of an optical network.

FIG. 2 illustrates an optical system 200 that may operate in a repeatered or unrepeatered optical link, and that may operate in a terrestrial and/or submarine optical link. The optical system 200 includes an optical transmission node 201 at one end of the optical fiber link 203, and an optical reception node 202 at the other end of the optical fiber link 203. If used in the optical communication system 100 of FIG. 1, and if the optical communication system 100 were an unrepeatered optical system, the transmission node 201 of FIG. 2 may be, may include, or may be included within terminal 101 of FIG. 1 and the reception node 202 of FIG. 2 may be, may include, or may be included within the terminal 102 of FIG. 1. If used in the optical communication system 100 of FIG. 1, and if the optical communication system 100 were a repeatered optical system, the transmission node 201 of FIG. 2 may be, may include, or may be included within the terminal 101 of FIG. 1, or an optical add-drop multiplexer between terminals 101 and 102. In that case, the reception node 202 of FIG. 2 may be, may include, or may be included within the terminal 102 of FIG. 1 or an optical add-drop multiplexer between terminals 101 and 102.

The optical link 203 includes a series of distributed dispersion compensating mechanisms 204, each separate in the optical path by one or more optically dispersive line fiber segments 205. For instance, in the illustrated embodiment of FIG. 2, there are three distributed dispersion compensation mechanisms 204A, 204B and 204C (referred to collectively as "dispersion compensation mechanisms 204"). However, the principles described herein may be applied to any optical link having any number of distributed dispersion compensation mechanism(s) and may also be applied to optical links without any dispersion compensation mechanisms. The dispersion compensating mechanisms 204 might be dispersion compensating modules, as might be common in a terrestrial long-haul optical link. Submarine long-haul optical links, on the other hand, often only consist of line fiber segments between repeaters/terminals. In that case, the dispersion compensating mechanisms 204 may each simply be dispersion compensative fiber segments that compensate for the dispersive fiber segments 205.

Furthermore, the illustrated embodiment is shown in which there is but one optical fiber segment between each dispersion compensation mechanism. For instance, there is but one optical fiber segment 205A between transmission node 201 and dispersion compensating mechanism 204A, one optical fiber segment 205B between the dispersion compensations mechanisms 204A and 204B, one optical fiber segment 205C between the dispersion compensation mechanisms 204B and 204C, and one optical fiber segment 205D between dispersion compensation mechanism 204C and reception node 202. However, there may be zero or two or more optical fiber segments between each dispersion compensation mechanism. The four optical fiber segments 205A, 205B, 205C and 205D may be referred to hereinafter as "fiber segments 205".

As an optical pulse travels through an optical fiber segment, the optical pulse may experience positive or negative dispersion, depending on the physical properties of the optical fiber segment. In order to at least partially compensate for dispersion that the optical signal has already experienced and/or is anticipated to experience, dispersion compensating modules (DCMs) or dispersion compensating fiber may be placed into the optical link. There may be a number of dispersion accumulation and dispersion compensation stages as the optical signal traverse through the optical link 203 from the transmission node 201 to the reception node 202. In this description and in the claims, a "dispersion map" is a plot of accumulated dispersion versus distance in an optical link from the transmission node to the receiver node including dispersion at the transmission node and receiver node. A few examples of dispersion maps are illustrated with respect to FIGS. 4A and 4B, and FIGS. 5A and 5B, and will be described further below.

Figure 3:
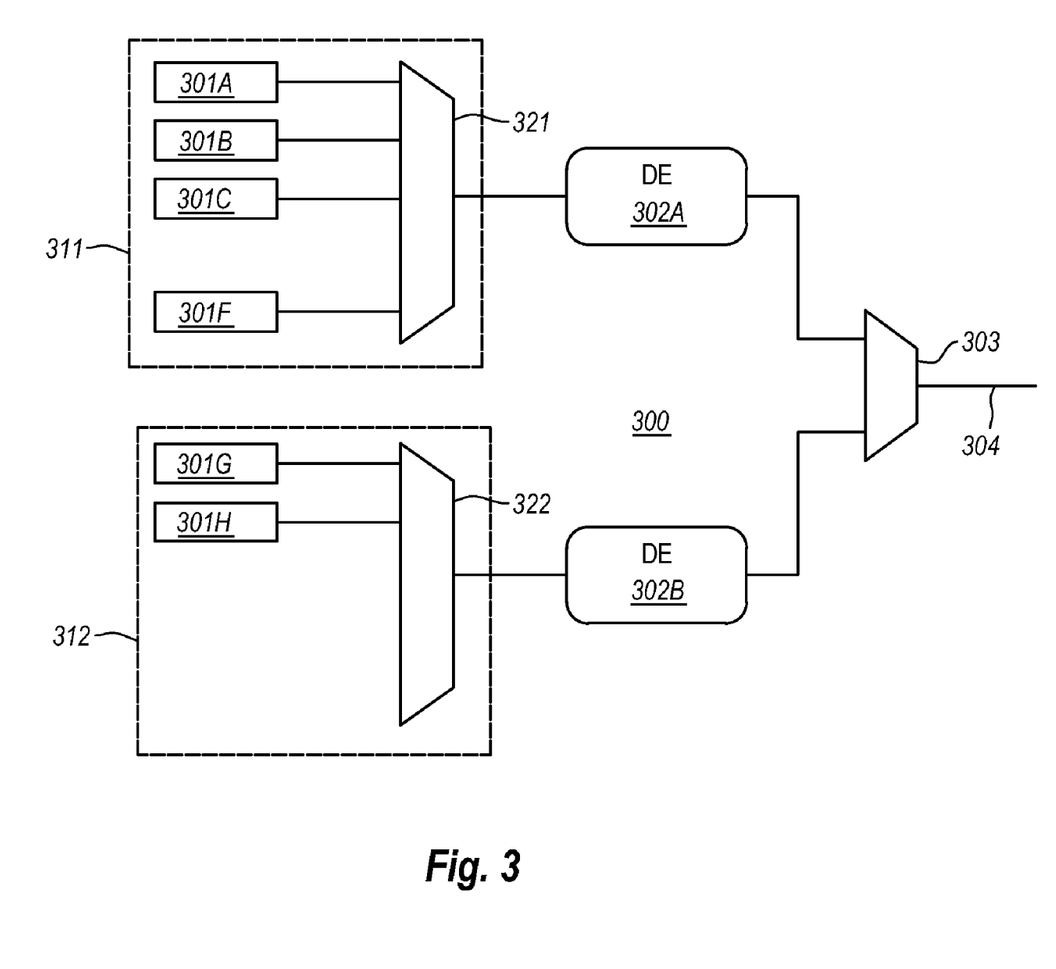
FIG. 3 schematically illustrates an example of the transmission node of FIG. 2.

FIG. 3 illustrates an example of an optical transmission node 300 which represents one example of the optical transmission node 201 of FIG. 2. The optical transmission node 300 may also be referred to herein as an optical introduction node as it introduces or merges non-coherent optical wavelength channels and coherent optical wavelength channels to be transmitted down optical link 203 as will be described further herein.

The optical transmission node 300 has access to a non-coherent source 311 that provides one or more non-coherent optical wavelength channels. Non-coherent optical wavelength channels are the optical wavelength channels that will be directly (or non-coherently) detected without measuring the phase and amplitude of electric field of the optical signal. In this example, the non-coherent source 311 provides a set of six non-coherent optical wavelength channels 301A through 301F. However, the principles described herein apply regardless of how many non-coherent optical wavelength channels are provided by the non-coherent source 311. An optical multiplexer 321 combines all of the non-coherent optical wavelength channels.

The optical transmission node 300 also has access to a coherent source 312 that provides one or more coherent optical wavelength channels. Coherent optical wavelength channels are the optical wavelength channels that will be coherently detected. In this example, the coherent source 312 provides a set of two coherent optical wavelength channels 301G and 301H. However, the principles described herein apply regardless of how many coherent optical wavelength channels are provided by the coherent source 312. An optical multiplexer 322 combines all of the coherent optical wavelength channels. The optical wavelength channels 301A through 301H may be in, for example, the C-band and/or L-band, and may be Wavelength Division Multiplexed (WDM) signals or Dense WDM (DWDM) optical channels.

The non-coherent optical wavelength channels are to have one dispersion map (called hereinafter a "non-coherent dispersion map"), and the coherent optical wavelength channels are to have another significantly different dispersion map (called hereinafter a "coherent dispersion map"). Coherent and non-coherent detection mechanisms are very different in their sensitivity to dispersion maps. For non-coherent detection (also called "direct detection"), current systems compensate for dispersion frequently over the link so as to keep the absolute value of the accumulated dispersion relatively low. Direct detection may also rely on a final dispersion compensation that reduces the total accumulated optical dispersion to low levels. On the other hand, for coherent detection, the absolute value of accumulated dispersion may be allowed to be quite high, perhaps even as high as 50,000 ps/nm. Furthermore, if dispersion is to approach too close to zero, non-linear distortion may reduce the signal quality or effectiveness of coherent detection. Thus, different dispersion maps may be formulated for optical wavelength channels that are to be subjected to coherent detection as opposed to direct detection.

In FIG. 3, the six non-coherent optical wavelength channels 301A through 301F are illustrated as being introduced into multiplexer 321 which combines the channels into one fiber and further passes the channels through optional dispersive element (DE) 302A at the transmission node 300. Although the six optical wavelength channels 301A through 301F are illustrated as being introduced to the DE 302A as a single signal, that is not required. Similarly, the two coherent optical wavelength channels 301G and 301H are illustrated as being introduced into multiplexer 322 which combines the channels into one fiber and further passes the channels through DE 302B at the transmission node 300. Although the two optical wavelength channels 301G and 301H are illustrated as being introduced to the DE 302B as a single signal, that is not required.

The set of non-coherent optical wavelength channels 301A through 301F (hereinafter also referred to as the "non-coherent channel set" or "non-coherent optical wavelength channel set") and the set of coherent optical wavelength channels 301G and 301H (hereinafter also referred to as the "coherent channel set" or "coherent optical wavelength channel set") are subjected to different applied dispersion at the transmission node 300. The DE 302A is optional because, depending on the implementation, a DE 302A might not be needed for the non-coherent channel set in order to achieve the desired separation in the non-coherent and coherent dispersion maps. Likewise, the DE 302B is optional because, depending on the implementation, a DE 302B might not be needed for the coherent channel set in order to achieve the desired separation in the non-coherent and coherent dispersion maps.

The DE 302A and the DE 302B may be any dispersion mechanism, even unconventional dispersion mechanisms. For instance, a chirped modulator may be used to introduce a certain amount of dispersion into a signal. The DEs 302A and 302B may be considered in their aggregate to be a dispersion element that introduces different dispersion levels into either or both of the coherent optical wavelength channels and the non-coherent optical wavelength channels such that the one or more coherent optical wavelength channels have a shifted dispersion map as compared to the one or more non-coherent optical wavelength channels.

If the transmission node 300 were an optical add/drop multiplexer, the optical wavelength channels that represent the main flow of optical channels may already be in combined form, thereby obviating the need for a multiplexer. For instance, in the case of coherent optical wavelength channels being added to non-coherent optical wavelength channels, the non-coherent optical wavelength channels 301A through 301F may already be combined, thereby negating the need for a multiplexer 321. Additionally, if the transmission node 300 is not the point of generation of the optical wavelength channels 301G and 301H, then the coherent optical wavelength channels 301G and 301H might also be already combined thereby negating the need for multiplexer 322. Thus, source 312 represents a set of coherent optical wavelength channels that is either generated locally or generated remotely and transported to the add/drop multiplexer to be added to the set of non-coherent optical wavelength channels 311.

In the case of the transmission node 300 being the terminal 101 of FIG. 1, however, the optical wavelength channels 301A though 301H may each be generated using distinct transmitters, and thus in that case, the multiplexers 321 and 322 may be used.

An optical multiplexer 303 combines each of the coherent channel set and the non-coherent channel set into a single mixed signal 304 for transmission onto the optical link. Thus, in this case, the non-coherent channel set is dispatched onto the optical link with a different accumulated dispersion as compared to the coherent channel set. Thus, even if the non-coherent and coherent channels set travel through the optical link and experience the same incremental changes in dispersion, the accumulated dispersion of the first channel set would remain offset from the accumulated dispersion of the second channel set.

In one embodiment, the dispersive element within the transmission node 300 causes the coherent dispersion map to be shifted by at least 1000 ps/nm from the zero dispersion point. The coherent dispersion map may also be shifted by 2000 ps/nm from the zero dispersion point. However, since coherent dispersion maps may be shifted up to 50,000 ps/nm, even more dispersion shifting may be performed.

Figure 4A:
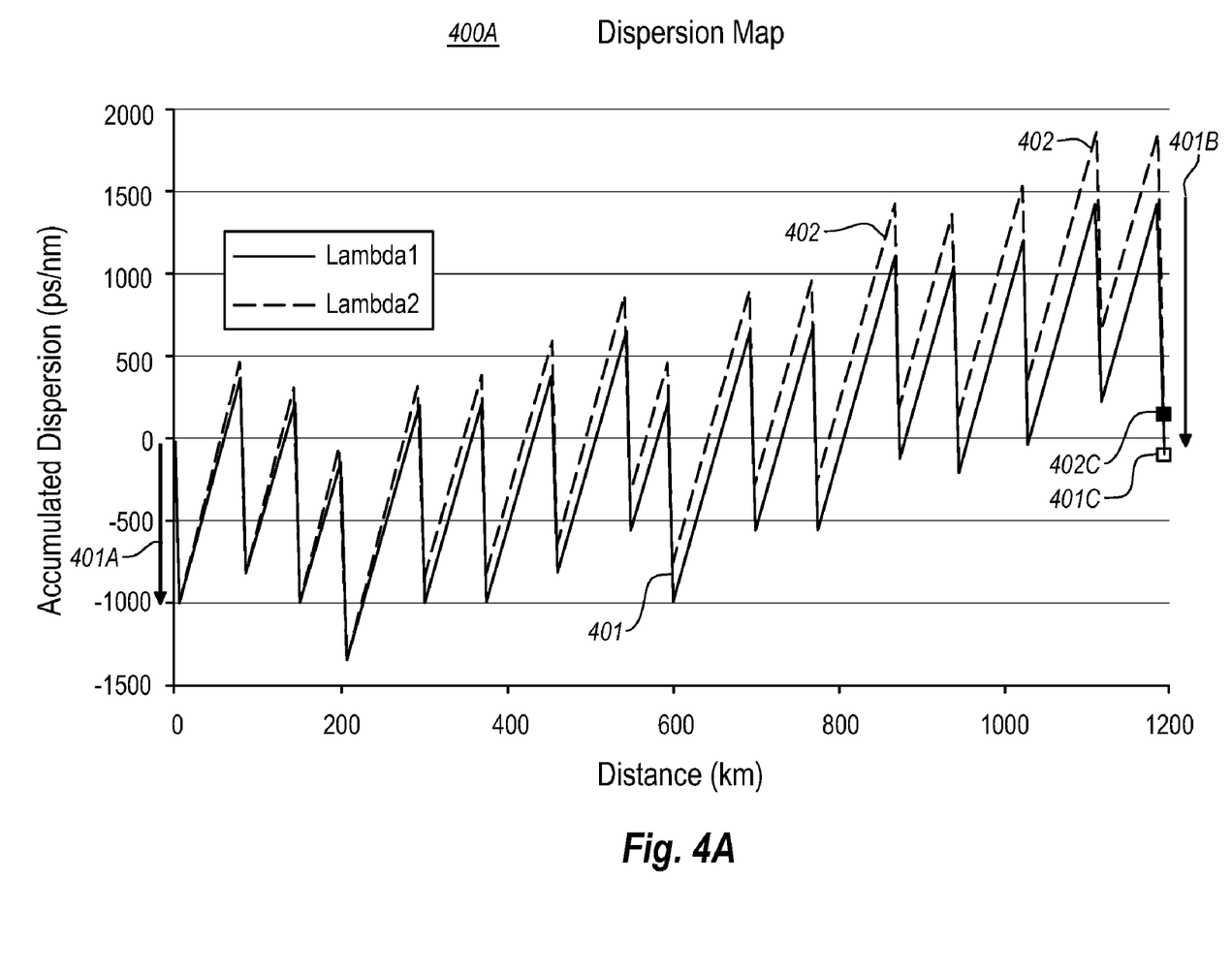
FIGS. 4A and 4B illustrate a conventional dispersion map graph with transmit and receive dispersion compensation.
Figure 4B:
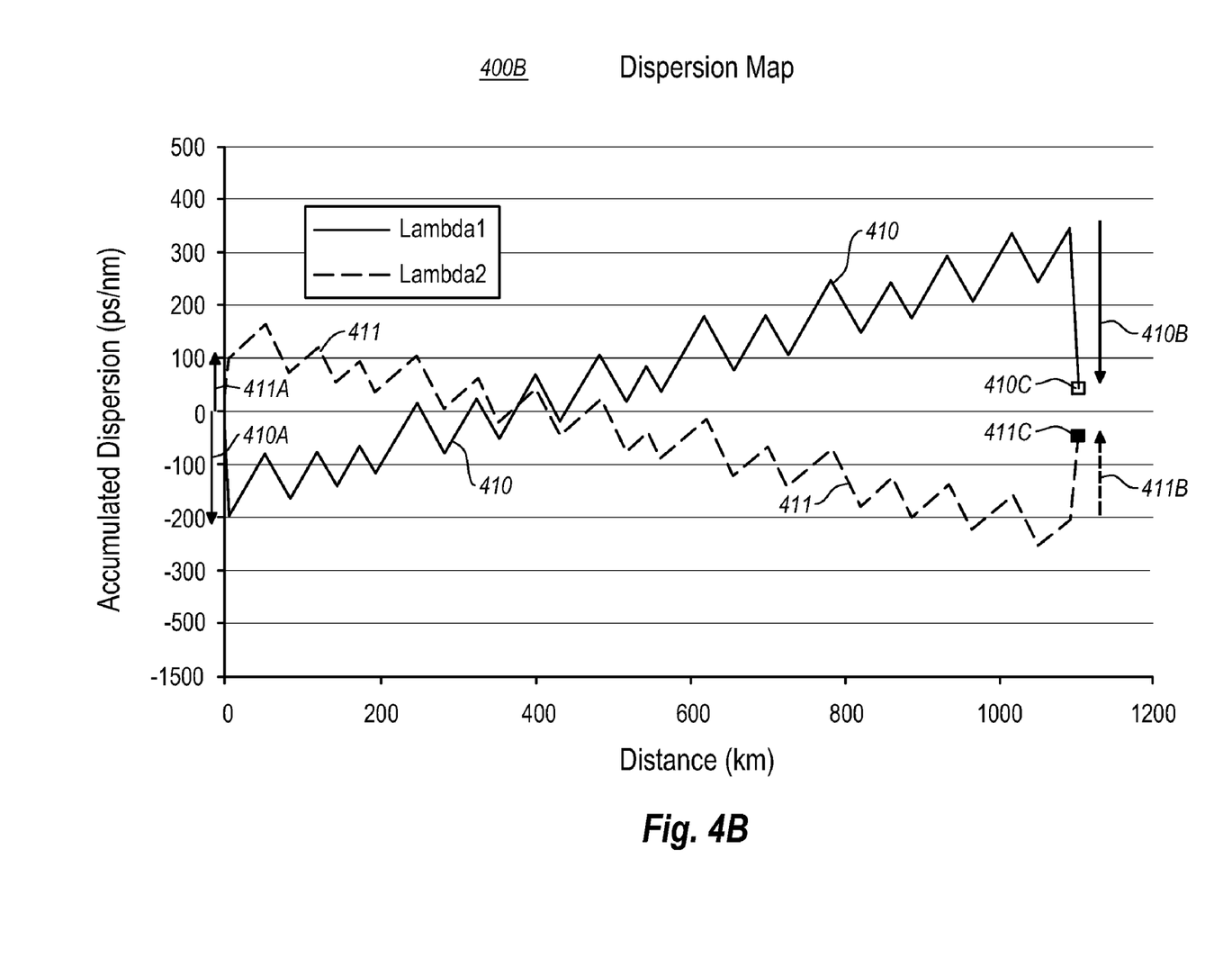

Several dispersion map examples will now be described. First, FIGS. 4A and 4B illustrate dispersion maps possible using conventional systems. A dispersion map is referred to herein as "positive" if the total accumulated dispersion excluding the dispersion in the transmission and receiver node is greater than zero (which is to say that the dispersion map just prior to the receiver node has greater accumulated dispersion than the dispersion map just after the transmission node). A dispersion map is referred to herein as "negative" if the total accumulated dispersion excluding the dispersion in the transmission and receiver node is less than zero (which is to say that the dispersion map just prior to the receiver node has less accumulated dispersion than the dispersion map just after the transmission node).

FIG. 4A is a typical positive dispersion map 400A of an optical link with DCMs in every span. Here, there is a dispersion map 401 shown for a first wavelength (lambda1—represented by the solid line), and a dispersion map 402 shown for a second wavelength (lambda2—represented by the dashed line). For both wavelengths, the dispersion maps are positive. The arrows 401A and 401B at the transmit (Tx) and receive (Rx) side, respectively, show DCM-applied dispersion compensation that are applied at the Tx and Rx terminals, often referred to as pre-compensation and post-compensation, respectively. The square 401C show the total accumulated dispersion of lambda1 which is close to zero. The square 402C show the total accumulated dispersion of lambda2 which is also close to zero. In this case, the pre-compensation is the same DCM for all channels, which is relatively common in conventional optical links.

In FIG. 4B, once again, there are two dispersion maps shown including dispersion map 410 for one optical wavelength channel (lambda1—represented by the solid line), and another dispersion map 411 for another optical wavelength channel (lambda2—represented by the dashed line). Since the dispersion map is a function of the optical wavelength, it may be possible that the dispersion map is positive at some wavelengths and negative at other wavelengths. FIG. 4B shows a condition in which the dispersion map 410 for the lambda1 wavelength is positive, whereas the dispersion map 411 for the lambda2 wavelength is negative. For submarine systems, often a mix of positive-dispersion and negative-dispersion line fiber is used, such that DCMs are only used for pre-compensation and post-compensation, with no in-line DCMs. This may result in a mix of positive dispersion maps and negative dispersion maps depending on the optical wavelength of the corresponding channel.

In FIG. 4B, there is a different pre-compensation 410A and 411A performed on each optical wavelength channel for each dispersion map 410 and 411, respectively, and a different post-compensation 410B and 411B performed for each dispersion map 410 and 411, respectively. Once again, squares 410C and 411C show the final accumulated dispersion after post-compensation. In the case of FIG. 4B, the pre-compensation is different for different non-coherent channels. This is done in order to keep the dispersion map average value closer to zero when there is a large variation of dispersion with wavelength. There are some nonlinear penalties that occur for direct-detected channels when the dispersion map is too regular around zero dispersion, so it is common to apply pre-compensation in these cases.

Figure 5A:
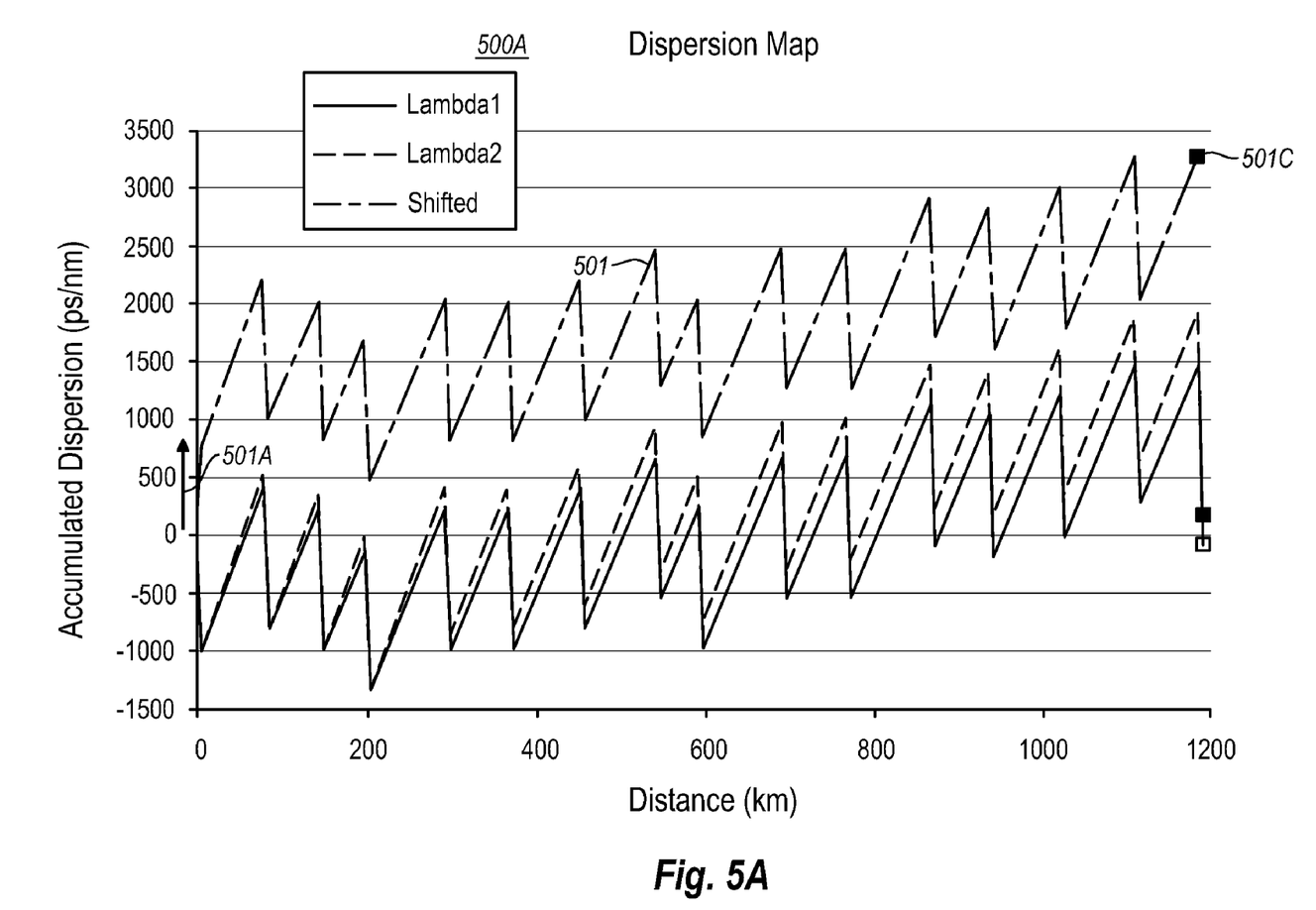
FIGS. 5A and 5B illustrate a dispersion map graph in which a second dispersion map is offset with respect to a first dispersion map.

FIG. 5A is similar to FIG. 4A, except that now a shifted dispersion map 501 is generated by applying a dispersion 501A at the transmission node. By shifting the dispersion, the dispersion map avoids crossing zero dispersion (or getting too close to zero) in the link between terminals. In the illustrated case, after the transmission node, the dispersion map remains such that, at any given point, the accumulated dispersion remains positive, and in fact, is above 500 ps/nm. If the optical wavelength channel were a coherent channel, then no post-compensation is needed since FIG. 5A clearly shows the final accumulated dispersion 501C to be well within the 50,000 ps/nm tolerance. However, if this tolerance level were approached or exceeded, post-compensation could be employed to get within the tolerance range.

Note that in FIG. 5A, the dispersion 501A introduced at the transmission node is positive even though the trend of the dispersion map is positively sloped. This is counterintuitive in conventional systems as negative dispersion would typically be introduced at the transmission terminal to compensate for an expected positive slope in the trend of the dispersion accumulation. For instance, in FIG. 4A, a negative dispersion 401A is added in order to account for an expected positive trend line in the dispersion accumulation.

Similarly, using the principles described herein, a negative dispersion may be introduced to coherent channels that are to be introduced with non-coherent channels, even though the trend line of the dispersion accumulation is also negative. For instance, even if the dispersion map were negative, a negative dispersion might be introduced by the transmission node to the coherent optical wavelength channels, resulting in the dispersion map having (at any given point) a negative accumulated dispersion (and perhaps even an accumulated dispersion less than minus 500 ps/nm) after the transmission node.

Figure 5B:
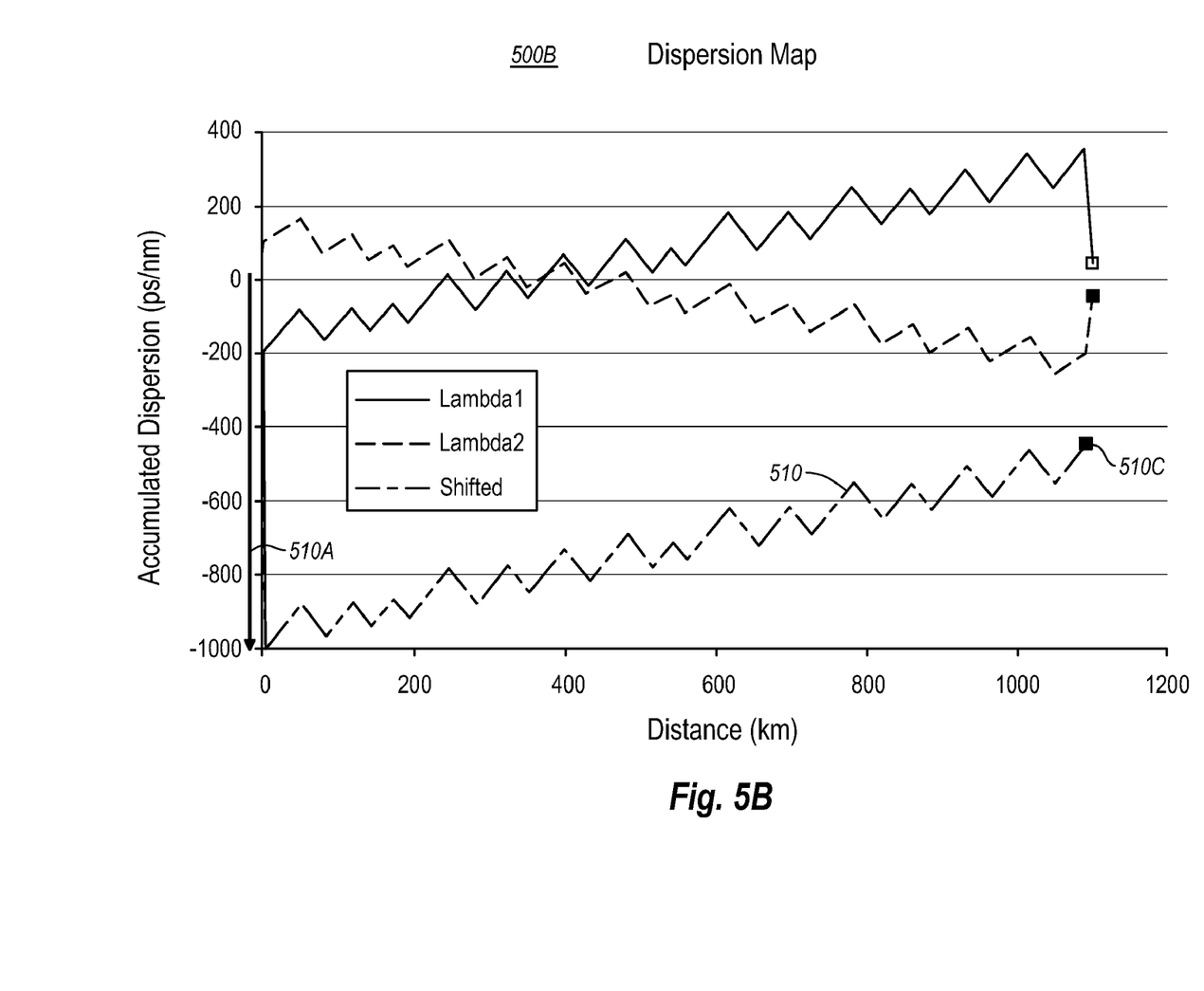

FIG. 5B is similar to FIG. 4B, except that now a shifted dispersion map 510 is generated by applying dispersion 510A at the transmission node, resulting in a final accumulated dispersion 510C at the reception node. The shifted dispersion map 510 is represented corresponding to a wavelength near lambda1. The shifted dispersion map for wavelengths near lambda2 is not illustrated in FIG. 2, but would result in a dispersion map that trended even more negative.

Once again, by shifting the dispersion, the dispersion map 510 avoids crossing zero dispersion (or getting too close to zero) in the link between terminals. If the optical wavelength channel were a coherent channel, then no post-compensation is needed unless the 50,000 ps/nm tolerance is approached or exceeded. Note that the different methodology between dispersion map 510 of FIG. 5B and the dispersion map 410 of FIG. 4B. Here, the dispersion introduced to the coherent channels resulting in dispersion map 510 is sufficient such that the coherent dispersion map 510 does not intersect with any of the dispersion maps of the non-coherent channels while dispersion map 410 normally intersects with the other dispersion maps of other non-coherent channels in the signal band. In other words, either the minimum of the dispersion map of any coherent optical wavelength channel of the coherent optical wavelength channel set is greater than the maximum of the dispersion map of any of the non-coherent optical wavelength channels of the non-coherent optical wavelength channel set at any point within the entire optical fiber link after the introduction node, or the maximum of the dispersion map of any coherent optical wavelength channel of the coherent optical wavelength channel set is less than the minimum of the dispersion map of any of the non-coherent optical wavelength channels of the non-coherent optical wavelength channel set at any point within the entire optical fiber link after the introduction node.

In one embodiment, the dispersion introduced could be sufficient to shift the dispersion map 510 to be no closer than 500 picoseconds per nanometer from the dispersion map of any non-coherent optical wavelength channels at any given point in the optical fiber link after the transmission node. In another embodiment, the dispersion introduced could have sufficient to shift the dispersion map 510 to be less than −500 picoseconds per nanometer at any given point in the optical fiber link after the transmission node.

Thus, a mechanism for mixing dispersion maps for mixed coherent and non-coherent optical channels in a single optical link is described. This may be accomplished even without changing the optical link itself. In situations in which the optical link is lengthy (e.g., hundreds or thousands of kilometers), or positioned in difficult locations (e.g., at the bottom of the ocean), the ability to apply two significantly distinct dispersion maps to different sets of optical wavelength channels is helpful. In one embodiment, the bit rate of the optical channels to be subjected to the second dispersion map may be different than the bit rate of the optical wavelength channels to be subjected to the first dispersion map. For instance, perhaps the optical wavelength channels of the coherent channel set are to have a bit rate of 100 Gigabits per second or greater, whereas the optical wavelength channels of the non-coherent channel set have a bit rate of 10 Gigabits per second, 20 Gigabits per second, or 40 Gigabits per second. Accordingly, the principles described herein may allow for some upgrading of an existing optical link without modifying the optical link and inline dispersion compensation. In fact in some upgrades of existing links, the configuration of the existing (for example, non-coherent channels) are not allowed to be changed at all. Thus, the principles described herein may allow for the addition of upgrade channels (for example, coherent channels) to an existing optical link that was designed to be optimized for non-coherent channels.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical system comprising:
    a non-coherent source that provides a set of one or more non-coherent optical wavelength channels;
    a coherent source that provides a set of one or more coherent optical wavelength channels;
    an introduction node that receives the non-coherent optical wavelength channel set from the non-coherent source, and receives the coherent optical wavelength channel set from the coherent source, and combines the coherent and non-coherent optical wavelength sets to form a mixed optical wavelength channel set that is provided onto an at least partially dispersion compensated optical fiber link, the introduction node comprising:
        a dispersive element that introduces different dispersion levels into either or both of the coherent optical wavelength channel set and the non-coherent optical wavelength channel set such that the coherent optical wavelength channel set has a shifted dispersion map as compared to the non-coherent optical wavelength channel set.

2. The optical system in accordance with claim 1, wherein each of the optical wavelength channels in the mixed optical wavelength channel set has a positive dispersion map, wherein the dispersive element applies sufficient dispersion difference between the coherent optical wavelength channel set and the non-coherent optical wavelength channel set such that the dispersion map of the coherent optical wavelength channel set is greater than 0 picoseconds per nanometer within the entire optical fiber link after the introduction node.

3. The optical system in accordance with claim 2, wherein the dispersive element applies sufficient dispersion difference such that the dispersion map of the coherent optical wavelength channel set is greater than 500 picoseconds per nanometer within the entire optical fiber link after the introduction node.

4. The optical system in accordance with claim 1, wherein each of the optical wavelength channels in the mixed optical wavelength channel set has a negative dispersion map, wherein the dispersive element applies sufficient dispersion difference between the coherent optical wavelength channel set and the non-coherent optical wavelength channel set such that the dispersion map of the coherent optical wavelength channel set is less than 0 picoseconds per nanometer within the entire optical fiber link after the introduction node.

5. The optical system in accordance with claim 4, wherein the dispersive element applies sufficient dispersion difference such that the dispersion map of the coherent optical wavelength channel set is less than minus 500 picoseconds per nanometer within the entire optical fiber link after the introduction node.

6. The optical system in accordance with claim 1, wherein the dispersive element applies sufficient dispersion difference between the coherent optical wavelength channel set and the non-coherent optical wavelength channel set such that either the minimum of the dispersion map of any coherent optical wavelength channel of the coherent optical wavelength channel set is greater than the maximum of the dispersion map of any of the non-coherent optical wavelength channels of the non-coherent optical wavelength channel set at any point within the entire optical fiber link after the introduction node or the maximum of the dispersion map of any coherent optical wavelength channel of the coherent optical wavelength channel set is less than the minimum of the dispersion map of any of the non-coherent optical wavelength channels of the non-coherent optical wavelength channel set at any point within the entire optical fiber link after the introduction node.

7. The optical system in accordance with claim 6, wherein the dispersive element applies sufficient dispersion difference such that the dispersion map of any coherent optical wavelength channel of the coherent optical wavelength channel set maintains a difference in accumulated dispersion of at least 500 picoseconds per nanometer at any point in the optical fiber link after the introduction node as compared to the dispersion map of any non-coherent optical wavelength channel of the non-coherent optical wavelength channel set.

8. The optical system in accordance with claim 1, wherein the dispersive element causes the dispersion map of the one or more coherent optical wavelength channels to be shifted to at least 1000 picoseconds per nanometer away from any of the non-coherent optical wavelength channels as introduced into the optical fiber link.

9. The optical system in accordance with claim 1, wherein the dispersive element causes the dispersion map of the coherent optical wavelength channel set to be shifted by a positive dispersion as compared to the dispersion map of the non-coherent optical wavelength channel set, even though the dispersion map of the non-coherent optical wavelength channel set is positive.

10. The optical system in accordance with claim 1, wherein the dispersive element causes the dispersion map of the coherent optical wavelength channel set to be shifted by a negative dispersion as compared to the dispersion map of the non-coherent optical wavelength channel set, even though the dispersion map of the non-coherent optical wavelength channel set is negative.

11. An optical system comprising:
    an optical fiber link that is at least partially dispersion compensated and which comprises at least a previous node, an introduction node, and a subsequent node, all of which being distinct nodes;
    a coherent source that provides a set of one or more coherent optical wavelength channels;
    wherein the introduction node receives the coherent optical wavelength channel set from the coherent source, and receives a non-coherent optical wavelength channel set of one or more non-coherent optical wavelength channels from the previous node in the optical fiber link, and combines the coherent and non-coherent optical wavelength sets to form a mixed optical wavelength channel set that is provided onto the optical fiber link in a direction toward the subsequent node, the introduction node further comprising a dispersive element that introduces different dispersion levels into either or both of the coherent optical wavelength channel set and the non-coherent optical wavelength channel set such that the coherent optical wavelength channel set has a dispersion map that is never equal to 0 picoseconds per nanometer within the entire optical fiber link after the introduction node.

12. The optical system in accordance with claim 11, wherein the dispersive element applies sufficient dispersion such that the dispersion map of the coherent optical wavelength channel set is never between +500 picoseconds per nanometer and −500 picoseconds per nanometer within the entire optical fiber link after the introduction node.

13. A method for mixing one or more coherent optical wavelength channels and one or more non-coherent optical wavelength channels in an optical fiber system, the method comprising:
 an act of accessing a non-coherent optical wavelength channel set;
 an act of accessing a coherent optical wavelength channel set;
 an act of introducing dispersion into either or both of the coherent optical wavelength channel set and the non-coherent optical wavelength channel set such that the coherent optical wavelength channel set has a shifted dispersion map as compared to the non-coherent optical wavelength channel set;
 an act of mixing the non-coherent optical wavelength channel set and the coherent optical wavelength channel set to produce a mixed optical wavelength channel set after the act of introducing dispersion; and
 an act of providing the mixed optical wavelength channel set onto an at least partially dispersion compensated optical fiber link.

14. The method in accordance with claim 13, wherein each of the optical wavelength channels in the mixed optical wavelength channel set has a positive dispersion map, wherein the act of introducing dispersion applies sufficient dispersion difference between the coherent optical wavelength channel set and the non-coherent optical wavelength channel set such that the dispersion map of the coherent optical wavelength channel set is greater than 0 picoseconds per nanometer within the entire optical fiber link after the introduction node.

15. The optical system in accordance with claim 14, wherein the act of introducing dispersion applies sufficient dispersion difference such that the dispersion map of the coherent optical wavelength channel set is greater than 500 picoseconds per nanometer within the entire optical fiber link after the introduction node.

16. The method in accordance with claim 13, wherein each of the optical wavelength channels in the mixed optical wavelength channel set has a negative dispersion map, wherein the act of introducing dispersion applies sufficient dispersion difference between the coherent optical wavelength channel set and the non-coherent optical wavelength channel set such that the dispersion map of the coherent optical wavelength channel set is less than 0 picoseconds per nanometer within the entire optical fiber link after the introduction node.

17. The optical system in accordance with claim 16, wherein the act of introducing dispersion applies sufficient dispersion difference such that the dispersion map of the coherent optical wavelength channel set is less than minus 500 picoseconds per nanometer within the entire optical fiber link after the introduction node.

18. The optical system in accordance with claim 13, wherein the act of introducing dispersion applies sufficient dispersion difference such that either the minimum of the dispersion map of any coherent optical wavelength channel of the coherent optical wavelength channel set is greater than the maximum of the dispersion map of any of the non-coherent optical wavelength channels of the non-coherent optical wavelength channel set at any point within the entire optical fiber link after the introduction node or the maximum of the dispersion map of any coherent optical wavelength channel of the coherent optical wavelength channel set is less than the minimum of the dispersion map of any of the non-coherent optical wavelength channels of the non-coherent optical wavelength channel set at any point within the entire optical fiber link after the introduction node.

19. The optical system in accordance with claim 18, wherein the act of introducing dispersion applies sufficient dispersion difference such that the dispersion map of any coherent optical wavelength channel of the coherent optical wavelength channel set maintains a difference in accumulated dispersion of at least 500 picoseconds per nanometer at any point in the optical fiber link after the introduction node as compared to the dispersion map of any non-coherent optical wavelength channel of the non-coherent optical wavelength channel set.

* * * * *